July 2, 1929.  W. R. MOORE, JR  1,719,517
AUTOMATIC CIRCUIT BREAKER
Filed Sept. 8, 1927
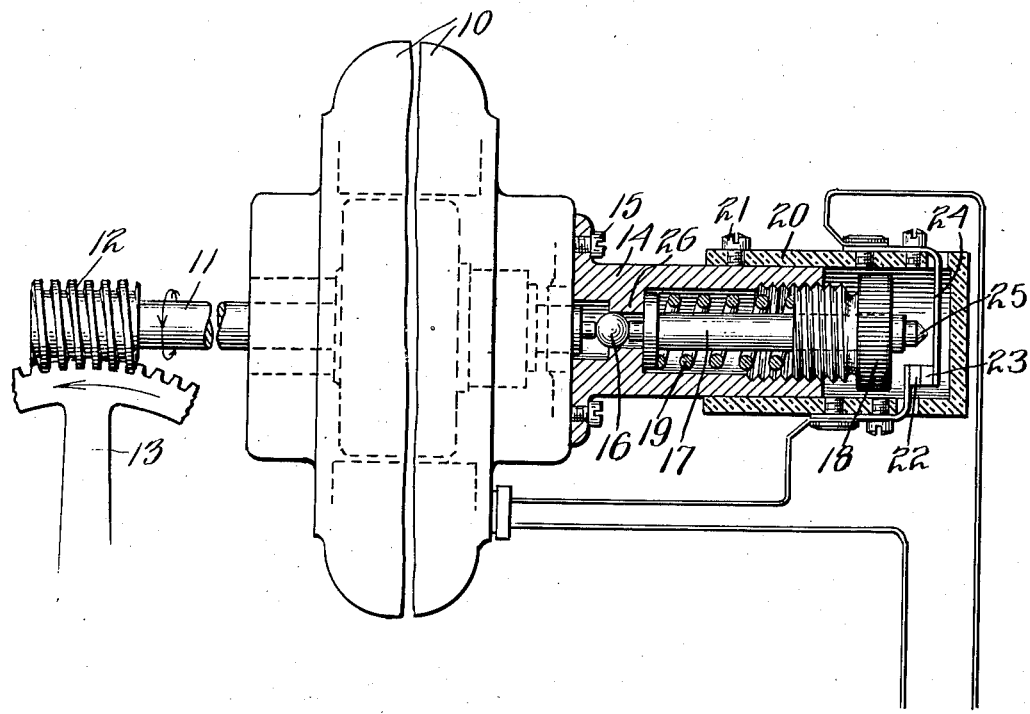
Inventor
William R. Moore Jr.
By
Attorney Patented July 2, 1929.

1,719,517

UNITED STATES PATENT OFFICE.

WILLIAM R. MOORE, JR., OF HAGERSTOWN, MARYLAND, ASSIGNOR TO DECA-DISC PHONOGRAPH COMPANY, OF WAYNESBORO, PENNSYLVANIA, A CORPORATION.

AUTOMATIC CIRCUIT BREAKER.

Application filed September 8, 1927. Serial No. 218,301.

My invention relates to an automatic circuit breaker for motors and it is an object of the invention to provide a device of this character which will function when a jam occurs to break the circuit and discontinue the operation of the motor.

My device is designed primarily to be used with automatic motor driven phonographs wherein the parts are driven from a worm mounted directly on the motor shaft. However, my device may be used in connection with any other mechanism having a direct worm drive from the motor shaft.

Referring to the accompanying drawing which is made a part hereof and on which similar reference characters indicate similar parts, The single figure is a fragmentary side elevation partly in section of a motor having my invention applied thereto.

In the drawing reference character 10 indicates an electric motor of standard construction having a rotor shaft 11 upon which is mounted a worm 12 for driving a worm wheel 13 connected with mechanism susceptible of jamming and stopping the rotation of the rotor shaft which if the circuit was not broken to the motor would cause the burning up of the same.

When the worm wheel 13, which is ordinarily driven by the worm 12, is prevented from rotating on account of a jamming of the mechanism, the continued rotation of the worm 12 will tend to move the worm and shaft 11 upon which it is mounted endwise and I therefore employ this endwise movement for breaking the electric circuit through the motor. The conventional end thrust bearing in the motor housing at the opposite end of the shaft from the worm 12 is omitted and a sleeve or housing 14 is secured by means of screws 15 in axial alinement with the motor shaft 11. The end thrust of the shaft 11 is accommodated by means of a thrust ball 16 which works against the end of a piston 14 which is freely slidable through an adjusting nut 18, said piston being held in a position to receive the thrust of the shaft 11 by means of a helical spring 19. The spring 19 is of sufficient strength, when the adjusting nut is in proper position, to hold the shaft 11 and rotor thereon in normal position during the maximum normal driving operation of the worm 12.

A sleeve or cap 20 of insulating material fits snugly on the housing 14 and is secured thereon by means of one or more set screws 21, said sleeve forming a support for cooperating contacts 22 and 23 which are disposed in series in one side of the motor circuit. The contact 23 is supported on a spring finger 24, which projects across the end of the piston 17 and a fiber or insulating point 25 is mounted on the end of the piston and is adapted to be moved endwise against the spring finger 24 for separating the contact 23 from the contact 22 thereby breaking the motor circuit.

The housing or sleeve 14 is provided with an inwardly directed annular collar 26, one side of which forms a seat for the piston and the reduced bore formed by such flange serves to guide the thrust ball 16 and hold the same in proper alinement with the end of the piston.

In order to prevent undue or rapid wearing of the adjacent ends of the rotor shaft and piston I preferably provide them with hardened extremities which bear against the thrust ball 16.

When the motor is operating, the shaft 11 and worm 12, carried thereby, will be rotating in the direction of the arrows and the worm wheel 13 will likewise be rotating in the direction indicated. If, for any reason such as by locking or jamming of the mechanism, the worm wheel 13 is prevented from further rotation the worm 12 will tend to move longitudinally carrying with it the shaft 11, the opposite end of which will engage the thrust ball 16 which in turn will force the piston outwardly against the action of the spring 19 and the fiber point 25 will engage the spring member 24 and separate the contact 23 from the contact 22 thus breaking the circuit through the motor.

By adjusting the nut 18 the force required for moving the piston longitudinally for breaking the circuit may be varied so that proper adjustment may be had.

It will be obvious to those skilled in the art that various changes may be made in my device without departing from the spirit of the invention, and I, therefore, do not limit myself to what is shown in the drawing and described in the specification, but only as set forth in the appended claims.

Having thus fully described my said invention, what I claim as new and desire to secure by Letters Patent, is:

1. The combination of a motor having a motor shaft, means for driving mechanism from said shaft whereby when sufficient resistance is offered to the driving operation the shaft will be moved endwise, means for normally holding said shaft in proper axial position, cooperating contacts, a resilient contact finger supporting one of said contacts and extending across the end of the shaft and arranged to move one of the contacts out of engagement with the other contact upon the endwise movement of the shaft, substantially as set forth.

2. The combination of a motor having a motor shaft, means for driving mechanism from said shaft whereby when sufficient resistance is offered to the driving operation the shaft will be moved endwise, means for normally holding said shaft in proper axial position, means for varying the tension of said yieldable means, cooperating contacts, a contact finger supporting one of said contacts and extending across the end of the shaft and arranged to move one of the contacts out of engagement with the other contact upon the endwise movement of the shaft, substantially as set forth.

3. A motor having a motor shaft, a housing associated with said motor, a piston supported by said housing and movable toward the end of the shaft, spring means for moving said piston toward the end of the shaft, and a switch engageable by said piston for breaking the circuit through the motor upon endwise movement of said shaft, substantially as set forth.

4. A motor having a motor shaft, a housing associated with said motor, a piston supported by said housing and movable toward the end of the shaft, spring means for moving said piston toward the end of the shaft, a switch operable by said piston for breaking the circuit through the motor upon endwise movement of said shaft, and a thrust ball disposed between the end of the motor shaft and said piston, substantially as set forth.

5. A motor having a motor shaft, a housing mounted on said motor, a thrust ball in said housing for engaging the end of the motor shaft, a piston in said housing engaging said thrust ball, a spring engaging said piston for yieldingly pressing the same toward said thrust ball, an adjusting nut for varying the tension on said spring, said piston being slidable through said adjusting nut, and a spring contact finger extending transversely of said piston and arranged to be operated for breaking the circuit through the motor upon endwise movement of the motor shaft, substantially as set forth.

In witness whereof, I have hereunto set my hand at Waynesboro, Pennsylvania, this 7th day of September, A. D. nineteen hundred and twenty-seven.

WILLIAM R. MOORE, Jr.